(12) United States Patent
Mishra et al.

(10) Patent No.: US 10,411,641 B2
(45) Date of Patent: Sep. 10, 2019

(54) METHOD AND SYSTEM FOR OPTIMALLY DISTRIBUTING POWER BETWEEN A BATTERY AND A POWER GRID

(71) Applicant: SIGNIFY HOLDING B.V., Eindhoven (NL)

(72) Inventors: Priya Ranjan Mishra, Bangalore (IN); Srikanth Tunga, Bangalore (IN); Goutam Maji, Bangalore (IN)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/728,802

(22) Filed: Oct. 10, 2017

(65) Prior Publication Data

US 2018/0102728 A1  Apr. 12, 2018

(30) Foreign Application Priority Data

Oct. 10, 2016  (IN) ............................. 201641034680
Mar. 1, 2017  (EP) .................................... 17158648

(51) Int. Cl.
*H02J 1/10*  (2006.01)
*H02S 10/20*  (2014.01)
(Continued)

(52) U.S. Cl.
CPC ................ *H02S 10/20* (2014.12); *F21S 9/03* (2013.01); *H02J 3/32* (2013.01); *H02J 3/383* (2013.01);
(Continued)

(58) Field of Classification Search
CPC ..... H02S 10/20; F21S 9/03; F21W 2131/103; H02J 3/383; H02J 13/0062; H02J 3/32;
(Continued)

(56) References Cited

U.S. PATENT DOCUMENTS 10,027,378 B2 * 7/2018 Umeda ................... H02J 7/025
2011/0084646 A1   4/2011 Lisi et al.
(Continued)

FOREIGN PATENT DOCUMENTS

EP    2763265 A1   8/2014
WO   9841793 A2   9/1998

*Primary Examiner* — Alfonso Perez Borroto
*Assistant Examiner* — Esayas G Yeshaw
(74) *Attorney, Agent, or Firm* — Meenakshy Chakravorty

(57) ABSTRACT

A method is provided, repeated over successive time slots, for controlling the distribution of power from a time varying renewable power source between a battery and a power grid. The method comprises comparing the maximum input power of a battery with the power output of the time varying power source and determining a ratio for distributing the power between the battery and the power grid based on the comparison. Wherein distributing the output power to the energy storage device as a priority when the output power of the power source is below the maximum input power of the energy storage device; and increasing the ratio for the grid and decreasing the ratio for the energy storage device as the output power of the power source increases above the maximum input power of the energy storage device. The surplus power produced by the power source, above the maximum input power of the energy storage device, is discarded when the output power is distributed to the energy storage device.

12 Claims, 5 Drawing Sheets

(51) Int. Cl.
*F21S 9/03* (2006.01)
*H02J 3/38* (2006.01)
*H02J 13/00* (2006.01)
*H02J 3/32* (2006.01)
*H02J 7/00* (2006.01)
*H02J 7/35* (2006.01)
*F21W 131/103* (2006.01)

(52) U.S. Cl.
CPC ............... *H02J 3/385* (2013.01); *H02J 7/00* (2013.01); *H02J 7/35* (2013.01); *H02J 13/0062* (2013.01); *F21W 2131/103* (2013.01); *Y02E 10/563* (2013.01); *Y02E 10/566* (2013.01); *Y02E 10/58* (2013.01); *Y02E 70/30* (2013.01)

(58) Field of Classification Search
CPC ..... H02J 3/385; H02J 7/00; H02J 7/35; H05B 37/00
See application file for complete search history.

(56) References Cited

U.S. PATENT DOCUMENTS

| | | | |
|---|---|---|---|
| 2011/0095609 A1* | 4/2011 | Cardinal | H02J 3/24 307/43 |
| 2011/0133688 A1 | 6/2011 | Ishibashi | |
| 2012/0133333 A1* | 5/2012 | Morioka | H01M 10/441 320/134 |
| 2012/0139472 A1 | 6/2012 | Ishibashi | |
| 2012/0235497 A1 | 9/2012 | Sakai et al. | |
| 2013/0138256 A1* | 5/2013 | Sako | H02J 3/14 700/286 |
| 2014/0049207 A1* | 2/2014 | Nakagawa | B60L 11/1824 320/103 |
| 2015/0115710 A1 | 4/2015 | Tuerk et al. | |
| 2015/0155712 A1* | 6/2015 | Mondal | H02J 3/1857 307/23 |
| 2015/0276277 A1* | 10/2015 | Keleshian | F25B 5/04 62/236 |
| 2015/0326012 A1* | 11/2015 | Tsuchiya | B60L 11/00 307/20 |

* cited by examiner

METHOD AND SYSTEM FOR OPTIMALLY DISTRIBUTING POWER BETWEEN A BATTERY AND A POWER GRID

FIELD OF THE INVENTION

This invention relates to the field of electrical power distribution, and more specifically to electrical power distribution methods that include a grid feed-in capability.

BACKGROUND OF THE INVENTION

The ability to access electricity is a crucial factor in both the overall economic growth of a country and the overall quality of life of its inhabitants. In most parts of the world, areas without electricity are far less developed than areas with electricity. In areas with limited conventional energy reserves, rising demand for power coupled with inadequate power generation has made providing reliable electrical power without frequent disruption a major challenge.

In order to address the issue of providing reliable power and to tackle the challenge of climate change, there is an increasing focus on enhancing the use of renewable energy sources. The high levels of solar insolation in some developing countries, and inability to meet the demand for electricity through conventional energy sources, has encouraged local governments to promote schemes such as solar street lighting and solar rooftop photovoltaic (PV) systems by providing incentives and attractive power grid feed-in tariffs.

This has made PV systems increasingly popular. In order to make effective use of such government initiatives it is important to look for ways to efficiently utilize the power generated in solar PV systems with grid feed-in capability so as to not only reduce the capital cost, granting more accessibility to a wider range of users, but to also improve the grid reliability in weak grid regions.

Document WO2015/169131 describes the distribution of energy from the PV array to the battery and to the power grid at the same time. However, a simultaneous distribution such as this requires two control loops for the battery and the grid to be integrated together in order to obtain satisfactory performance from the system. This is a highly complex process.

A time-divided power distribution between the battery and the grid would be more suitable for simple use. A time-divided power distribution means the power is routed to either the battery or the grid at a given time, instead of being routed to both.

For providing safety and convenience to road users, PV based street lighting systems are becoming more popular as they are independent of the grid and so illuminate roads regardless of power grid conditions. For PV based street lighting systems, it is found that better utilization of the generated energy can be made by opting for a centralized distribution architecture over de-centralized systems. Various such centralized distribution architectures were investigated for their efficiency and complexity in street lighting applications and a narrow bus DC-centralized distribution architecture was found to render superior efficiency over other distribution architectures. DC-distribution architectures allow the use of DC based linear LED drivers, resulting in further energy savings over AC-distribution architectures.

The considerable fall in PV system prices over recent years and awareness of the negative environmental impact of batteries has resulted in new techniques for optimal sizing of PV systems for street lighting. These optimal PV system designs take the insolation levels on days with bad weather conditions into account, resulting in a system having high PV power generation capability and minimum battery charging requirements.

Such a system generates enough energy on cloudy days, with minimum insolation, to satisfy the energy requirement of the connected load. On days with a clear sky, optimally sized systems produce surplus energy which can be sold to utility companies to bring better return on the capital cost as well as bridge the gap between demand and supply of power in weak grid areas.

Most of the PV systems used for street lighting with grid feed-in capability use simple maximum power point tracking (MPPT) charge controllers and grid feed-in inverters. They are usually discrete and the control strategy employed in such systems allows the energy to be fed to the grid only after the battery is fully charged. For optimally sized systems with large PV power generation capability and low battery charging requirements, such a control strategy provides satisfactory performance on days with low solar insolation; however, on days with good solar insolation, the PV system remains largely underutilized.

This is because, with the increase in solar insolation, the maximum power available at the output of the PV array increases. However, the power required for charging the battery is limited by the battery voltage and charging current requirements. In other words, the power is limited by the maximum input power of the battery. During days of high solar insolation periods, the maximum power available at the PV array output is higher than the battery power requirement. In this situation, the MPPT charge controller is forced to operate the PV array at a lower operating power point equal to the maximum input power of the battery meaning that the excess power, that the PV array could generate, remains unutilized and is wasted.

US20120235497A1 discloses a method of controlling a battery storing electric power generated by a power generator, wherein it supplies to an electric power transmission system electric power corresponding to a target output value from at least one of the power generator and the battery.

SUMMARY OF THE INVENTION

It is an aim of the invention to reduce the power lost by a variable power source, such as a photovoltaic panel, when the maximum output power of the power source exceeds the maximum input power of the battery. It is a further aim of the invention to distribute the output power from the power source to the energy storage device and to the power grid in an optimized manner in order to benefit the whole system. The system uses a time-divided distribution for the output power instead of a time-shared (i.e. simultaneous) distribution in order to reduce the complexity of the system. The basic of the embodiments of the invention is that the optimal time-divided distribution is determined through a ratio of battery charging to grid feeding based on the maximum output power of the power source and the maximum input power of the energy storage device.

The invention is defined by the claims.

According to examples in accordance with an aspect of the invention, there is provided a method for distributing power from a renewable power source having a variable output power over time between an energy storage device and a power grid, wherein the method is adapted to, for each one of a plurality of time slots:

determine an output power of the power source in the respective time slot;

compare the output power of the power source to the maximum input power of the energy storage device;

determine a ratio for distributing the output power to the energy storage device or the power grid in the respective time slot based on the comparison; and distribute the output power from the power source to either the energy storage device or the power grid in divisions of time in the respective time slot according to the determined ratio, wherein surplus output power produced by the power source, above the maximum input power of the energy storage device, is discarded when the output power is distributed to the energy storage device.

By comparing the output power of the power source to the maximum input power of the energy storage device at each time slot, for example throughout the day, the power produced by the power source may be better utilized by both the energy storage device and the power grid.

Preferably, wherein distributing the output power to the energy storage device as a priority when the output power of the power source is below the maximum input power of the energy storage device; and increasing the ratio for the grid and decreasing the ratio for the energy storage device as the output power of the power source increases above the maximum input power of the energy storage device.

In the low power phase the energy storage is the priority, thus the energy storage is more likely to be charged sufficiently. During periods of time where the output power of the power source is higher than the maximum input power of the battery, the power may be, at least partly, directed to feed into the power grid, reducing the potential power lost. In this case, the discarded surplus power can be reduced.

In one embodiment, the method may be adapted to, when determining the output power of the power source, determine the output power of the power source by maximum power tracking during the proceeding time slot.

In this arrangement, the maximum power output during a time slot may be determined by maximum power tracking. This arrangement can explore the upper limit of the potential power generation by the power source. This maximum power output may be used to determine at what point in a given time slot the power should be fed into the power grid, or used to charge the battery.

The sequence of battery charging and grid feeding in each single time slot can be determined by the rate of variation of the output power from the power source. For example, during a time slot the output power may be increasing steadily, so that the maximum power output occurs at the end of the time slot. In this case, if the output power was higher than the maximum input power of the battery, it would be preferable to perform battery charging at the beginning of the time slot, when only a small proportion of the output power may be lost, followed by feeding the power into the power grid. Conversely, if the output power is decreasing steadily in a given time slot, the grid feeding can happen at first and then the battery charging happen. By performing this function, the minimum amount of power is lost due to the limitations of the battery.

In some arrangements, the controller may be adapted to, when determining the ratio for distributing power, set the ratio to one for the energy storage device, and zero for the power grid, thereby giving the energy storage device the priority, if the determined output power is below the maximum input power of the energy storage device. At times when the power source produces less power than the maximum input power of the battery, all of the output power may be used to charge the battery.

When the output power of the power source is less than or equal to the maximum input power of the battery for a given time slot, all of the output power may be utilized by the battery, resulting in no power loss during this time slot. In this design, the battery is likely to receive ample charge to ensure that it is fully charged by the end of the day. This may be even more relevant for cases where the variable power source is not active for certain portions of the day, for example solar panels during the night, as it ensures that the battery receives enough power during the active periods, for example the day, to allow it to supply constant power throughout the inactive periods, for example the night.

The battery is unable to utilize power above its maximum power input. However, grid feeding does not have an input power limit and so it can fully utilize all of the power output of the power source. In order to balance both charging the energy storage device and feeding into the power grid, as the power output increases above this threshold, allocating at least a portion of time to feeding into the power grid results in less wasted power that would not otherwise be used by the battery.

In some arrangements, the method may be adapted to, when determining the ratio for distributing power, set the ratio to one for the power grid, and zero for the energy storage device, thereby giving the power grid the priority, as the output power of the power source reaches the peak output power of the power source.

This embodiment further reduces/minimize the power loss by more accurately defining the power distribution ratio.

In some designs, the method may be adapted to, when determining the ratio for distributing power, set the ratio to one for the energy storage device, and zero for the power grid, if the power grid is not available.

In the situation that the grid is unavailable, for example if a power line was severed, then any power directed to feeding into the grid would be wasted. It would be preferable in this case for the battery to receive the generated power, even if the power output is above the maximum input of the battery, as it mitigates the potential power loss. The advantages of this feature become clearer in locations with unstable power grids, where access to the grid may be intermittent.

In some designs, the method may be adapted to, when determining the ratio for distributing power, set the ratio to zero for the energy storage device, and one for the power grid, if the energy storage device is fully charged.

In this design, the method is further optimized by taking into account the level of charge that the battery possesses. If the state of charge of the battery is known, the distribution of power to the battery or power grid may be performed with greater accuracy. As a simple example, if the battery is found to be fully charged, the entire time slot may be dedicated to feeding power into the grid. It is beneficial to divert power to feeding into the power grid in this situation as the power will not be wasted unnecessarily on attempting to charge the battery. If the charge of the battery was found to be under 10%, the entire time slot may be dedicated to charging the battery.

In an embodiment, the power source comprises a photovoltaic panel. The photovoltaic panel is a typical power source with variable output power. The traditional technology, as discussed in the background, cannot utilize it in a simple manner. The embodiment can utilize the photovoltaic panel better without using complex control loops.

In a further embodiment, the method may be adapted to, when determining the ratio for distributing power, determine an insolation of the photovoltaic panel, and set the ratio to one for the energy storage device and the ratio to zero for the power grid, if the insolation of the photovoltaic panel is less than a predetermined minimum value of insolation.

Low insolation of the photovoltaic panel means that there is less light incident on the photovoltaic panel, meaning that the power output from the photovoltaic panel is low. In order to meet the charging needs of the energy storing device in these conditions, all of the power output is distributed to the energy storage device for charging.

In some embodiments, the battery receives all of the output power from the power source for charging in constant voltage mode when either of the following two conditions comes are met: the output power of the power source is equal to or less than the maximum input power of the energy storage device or a certain time of the day is reached.

In this design, constant voltage charging is employed when power output from the power source is low. The power required for battery charging reduces continually when constant voltage charging is in use and so the battery may make efficient use of the generated power, even when the generated power levels are low. The certain time of the day is an additional condition for charging the battery with all of the output power, unless the battery has been fully charged. This meets the requirements of the energy storage device so as to avoid it becoming undercharged. For example, when the time comes to 15:00, all of the output power is distributed to the energy storage device for charging, unless it has been fully charged, so as to ensure that the energy storage device is fully charged before the evening.

In an embodiment, the battery is charged in constant current mode until the state of charge of the battery reaches 85%, after which the battery is charged in constant voltage mode until the state of charge of the battery reaches 100%. This arrangement is a well optimized charging solution for smaller batteries.

In some designs, the time slots comprise regular intervals throughout a solar radiation period.

According to examples in accordance with an aspect of the invention, there is provided a system for distributing power from a power source having a variable output power over time between a battery and a power grid, comprising:
　a power source;
　a battery connected to the power source;
　a connection between the power source and the power grid;
　a controller for controlling the distribution of power from the power source between the battery and the power grid, wherein the controller is adapted, in successive timeslots, to:
　　determine an output power of the power source;
　　compare the output power of the power source to the maximum input power of the battery;
　　determine a ratio for distributing power to the battery or the power grid based on the comparison; and
　　distribute the power from the power source to the battery or the power grid in divisions of time according to the determined ratio, wherein surplus output power produced by the power source, above the maximum input power of the energy storage device, is discarded when the output power is distributed to the energy storage device.

In some embodiments the power source may comprise a photovoltaic system the system may further comprise a light sensor.

In further embodiments, the controller is adapted to use insolation levels measured by the light sensor to determine the output power of the power source.

In this design, the power source of the system is a photovoltaic system, the output power of which may be determined by measuring the insolation levels with a light detector. At low levels of insolation, the output power of the photovoltaic system will be lower than the maximum input power of the battery and so the controller will select the battery to receive the power for charging. At high levels of insolation, the output power of the photovoltaic system will be higher than the maximum input power of the battery, meaning that the controller will give preference to feeding power to the power grid.

As the power output of the photovoltaic system is dependent on weather conditions, it is possible for the power output levels to change rapidly. For this reason, it is advantageous for the system to regularly check insolation levels in order to determine the power output of the photovoltaic system for a given time slot in order to optimize the behavior of the power distribution.

In some arrangements, the maximum output power of the power source is large in comparison to the maximum input power of the battery. This is the most effective design to be used in conjunction with the control system described above.

According to examples in accordance with an aspect of the invention, there is provided a method for distributing power from a power source having a variable output power over time between an energy storage device and a power grid, the method comprising, for each one of a plurality of time slots:
　determining an output power of the power source in the respective time slot;
　comparing the output power of the power source to the maximum input power of the energy storage device;
　determining a ratio for distributing the output power to the energy storage device or the power grid in the respective time slot based on the comparison; and
　distributing the output power from the power source to either the energy storage device or the power grid in divisions of time in the respective time slot according to the determined ratio, wherein surplus output power produced by the power source, above the maximum input power of the energy storage device, is discarded when the output power is distributed to the energy storage device.

The step of determining a ratio for distributing the output power may further comprise:
　setting the ratio to one for the energy storage device, and zero for the power grid, if the determined output power is below the maximum input power of the energy storage device;
　increasing the proportion of power distributed to the grid and decreasing the proportion of power distributed to the energy storage device as the output power of the power source increases above the maximum input power of the energy storage device; and
　setting the ratio to one for the power grid, and zero for the energy storage device, as the output power of the power source reaches the peak output power of the power source.

In another aspect, embodiments of the invention provides a computer readable medium storing a computer program, wherein said computer program is adapted to, when executed on a computer, cause the computer to carry out the steps of the method as discussed above.

These and other aspects of the invention will be apparent from and elucidated with reference to the embodiment(s) described hereinafter.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a controller and a method for distributing power from a power source having a variable output power over time between a battery and a power grid based on the comparison of various parameters of the battery and the power source.

Figure 1:
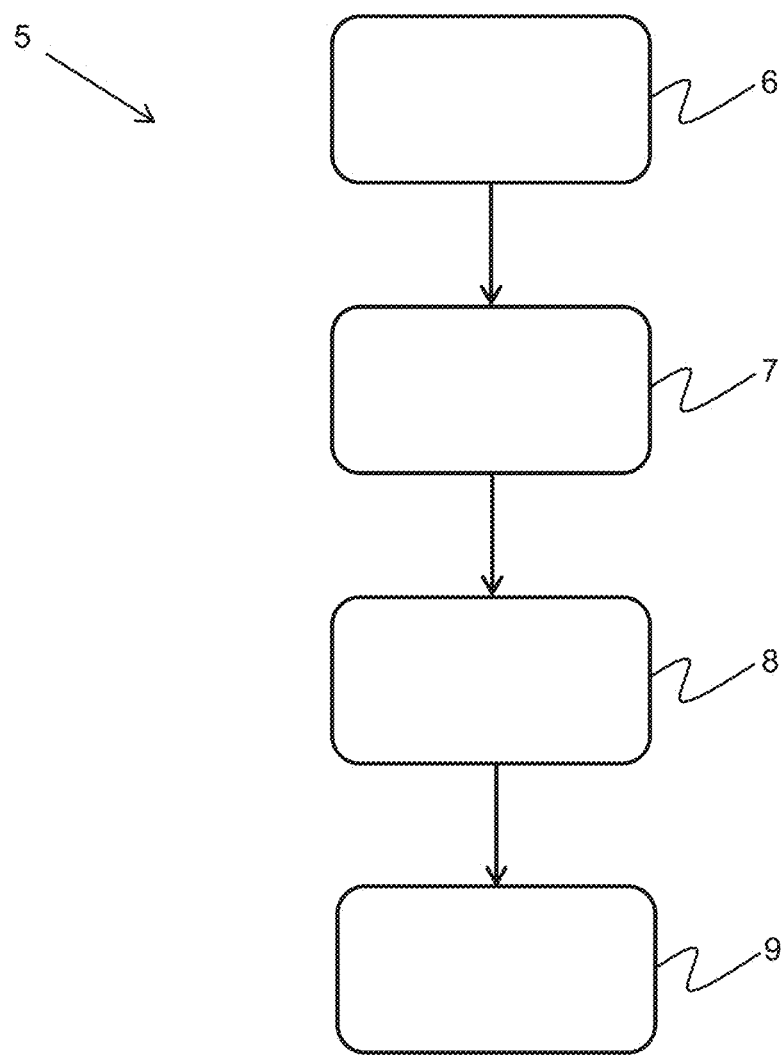
FIG. 1 shows a method for distributing power from a time varying power source between a battery and a power grid implemented by a controller of a control system.

FIG. 1 shows a method 5 of the invention.

In step 6, the output power of the power source is determined.

In step 7, the output power of the power source is compared to the maximum input power of the battery.

In step 8, a ratio for distributing power to the battery or the power grid is determined based on the comparison made in step 7.

In step 9, the power is distributed from the power source to the battery or the power grid in divisions of time according to the ratio determined in step 8.

When a battery is being charged, it is unable to accept more power than its maximum power input. The maximum power input of a battery may be obtained via the following formula:

$$P_{max\_bat} = \frac{V_{batt} \times I_{max\_bat}}{1000}$$

Wherein, $P_{max\_bat}$ is the maximum input power of the battery, measured in kW, $V_{batt}$ is the voltage at the battery terminal, measured in V, and $I_{max\_bat}$ is the maximum battery charging current, measured in A.

For a system with a time varying power source, such as a photovoltaic panel, it is possible that the power output of the power source will be greater than the maximum power input of the battery. In this case, the potential power that the power source is capable of generating above the maximum power input of the battery is unutilized when charging the battery. However, the power grid carries no such limitation and may utilize the full range of the power source. Further, it is important to ensure that the battery receives sufficient charge. Thus, a balance should be found for the benefit of the whole system including the battery and the power grid.

By comparing the maximum power input of the battery to the output power of the power source, it is possible to determine a ratio for distributing the power between charging the battery and feeding the power grid in an optimal manner in order to reduce power loss, feed the grid for a reasonable return of interest, and charge the battery as much as possible. For example, if the power output is less than or equal to the maximum power input of the battery, the power may be fully utilized by either the battery for energy storage. Further, if the power output is greater than the maximum input power of the battery, the power may be at least partly utilized by the power grid, meaning that an optimal system would shift the power distribution ratio in favor of feeding into the power grid to reduce power loss.

As the power output of the power source varies with time, it is necessary to repeat this method at regular intervals, throughout a solar radiation period for example, in order to ensure that the power is being distributed in an optimal way for the current conditions. In order to achieve this, a solar radiation period may be divided into discrete time slots as shown in the following equation:

$$t = t_1 + t_2 + \ldots + t_k + \ldots + t_{n-1} + t_n = \sum_{k=1}^{n} t_k$$

Wherein, t is the total time period, for example solar radiation period, $t_k$ is a discrete time slot, for example ten minutes, and n is the total number of discrete time slots in the total time period, for example one hundred and forty four in this case.

Each of the discrete time slots may be further divided into time divisions according to the ratio determined in step 8. The divisions are performed so as to obey the following formula:

$$t_{gk} = t_k - t_{bk}$$

Wherein, $t_{gk}$ is the time division of the discrete time slot, $t_k$, for distributing power to the power grid and $t_{bk}$ is the time division of $t_k$ for distributing power to the battery for charging.

The step of determining an output power of the power source, step 6, may comprise determining the maximum output power of the power source during the proceeding time slot. The maximum output power may be determined using the following equation:

$$P_{max\_PV}^{k} = \frac{V_{MPP}^{k} \times I_{MPP}^{k}}{1000}$$

Wherein, $P_{max\_PV}^{k}$ is the maximum power output of the power source during time slot k, measured in kW, $V_{MPP}^{k}$ is the voltage of the power source at its maximum power point in time slot k, measured in V, and $I_{MPP}^{k}$ is the current of the power source at its maximum power point in time slot k, measured in A. The P is in the unit of kilo watts thus the product of V and I is divided by one thousand. It should be understood that there are various technologies for maximum power tracking commonly used in photovoltaic systems.

By determining the maximum output power of the power source for a time slot, the ratio for distributing power to the battery or the power grid may be more accurately calculated. For instance, in a time slot where the output power of the power source is below the maximum input power of the battery, the ratio may preferentially distribute power to the battery. In the case where the maximum output power for the time slot had been determined from the power source, for example by measuring light levels for a solar panel, the ratio may have taken into account the power output rising above the maximum input power of the battery and shown preferential distribution of power to the power grid in the later division of the time slot. The potential power lost may be calculated in the following way:

$$P_{loss}^{k} = P_{max\_PV}^{k} - P_{batt}^{k}$$

Wherein, $P_{loss}^{k}$ is the power lost during time slot k, $P_{max\_PV}^{k}$ is the maximum power produced by the power source during time slot k and $P_{batt}^{k}$ is the power supplied to the battery during time slot k, all of which are measured in kW. The value of $P_{batt}^{k}$ may be calculated using the following equation:

$$P_{batt}^{k} = \frac{V_{batt}^{k} \times I_{batt}^{k}}{1000}$$

Wherein, $V_{batt}^{k}$ is the voltage at the terminal of the battery at the beginning of time slot k, measured in V, and $I_{batt}^{k}$ is the charging current of the battery at the beginning of time slot k, measured in A.

The method may also comprise a step for determining the state of charge of the battery. This step would further optimize the system for minimizing power loss. For example, if the battery is fully charged, any power distributed to the battery would be wasted. However, if it is known that the battery is full charged, the power distribution ratio may reflect this and preferentially distribute power to the power grid for that time slot. The state of charge of the battery may be used to calculate the energy needed to fully charge the battery in the following equation:

$$E_{bat\_deficit} = \frac{(1 - SOC_{ini}) \times V_{batt} \times B_{cap}}{1000}$$

Wherein, $E_{bat\_deficit}$ is the energy required to charge a battery from its initial state of charge to full capacity, measured in kWh, $SOC_{ini}$ is the initial state of charge of the battery, $V_{batt}$ is the voltage at the battery terminal, measured in V, and $B_{cap}$ is the total capacity of the battery, measured in Ah.

Figure 2:
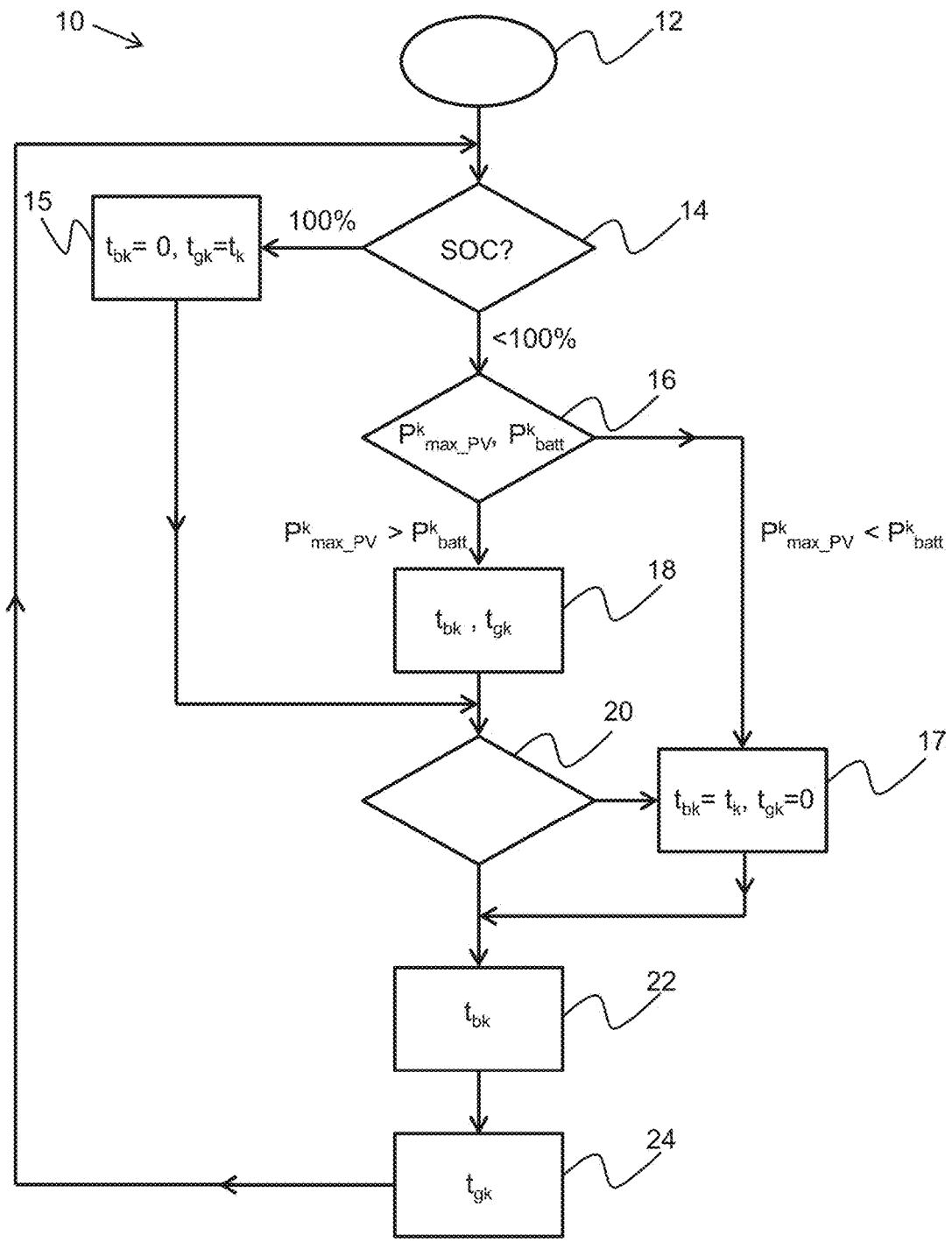
FIG. 2 shows a method for determining the ratio for time spent charging the battery to time spent feeding power to the power grid.

FIG. 2 shows an exemplary method 10 for determining the ratio in step 8.

In step 12, the method begins.

In step 14, the state of charge of the battery is determined. If the battery is fully charged then the method proceeds to step 15, which skips battery charging and distributes all of the output power to grid feeding, otherwise the method proceeds to step 16.

In step 16, the insolation of the PV panel is determined and compared to the minimum insolation value. If the insolation of the PV panel is less than minimum insolation value, meaning the solar radiation is low, the method proceeds to step 17, which skips grid feeding and distributes all of the output power to battery charging, otherwise the method proceeds to step 18.

In step 18, the ratio for distributing power to the battery or the power grid is determined. The ratio is calculated in the form of time divisions within a given time slot, $t_k$, for either charging the battery, $t_{bk}$, or feeding into the power grid, $t_{gk}$, so that $t_k = t_{gk} + t_{bk}$. The value of $t_{gk}$ may increase and the value of $t_{bk}$ may correspondingly decrease as the output power of the power source increases above the maximum input power of the battery. This step may be embodied by the following equation:

$$t_{bk} = \begin{cases} t_k, & P_{max\_PV}^{k} \leq P_{max\_bat} \\ t_k \cdot \left(1 - \frac{P_{max\_PV}^{k} - P_{max\_bat}}{P_{peak\_PV} - P_{max\_bat}}\right), & P_{max\_PV}^{k} > P_{max\_bat} \end{cases}$$

Wherein, $P_{peak\_PV}$ is the peak power rating of the power source, measured in kW, and the other symbols retain their meanings from above. This means that if the maximum output power of the PV panel in that time slot is less than or equal to the maximum input power of the battery, all time slot is used for charging the battery, namely $t_{bk} = t_k$. Otherwise, if the maximum output power of the PV panel in that slot is more than the maximum input power of the battery, the time for charging the battery is only a part of the time slot. The size of the part is in an inverse relationship with the maximum output power of the PV panel. As expressed in the above formula, as the maximum output power of the PV panel approaches the peak output power of the PV panel, based on historical data, the time for charging the battery approaches zero.

After the ratio has been determined, in step 20, the grid is tested to determine whether the grid is available for power feed-in. If the grid is not available the method proceeds to step 17, however, if the grid is available then the method proceeds to step 22.

Returning back to step 15, the battery has been detected as being fully charged meaning that the ratio for sending power to the battery is set to zero so that $t_{bk} = 0$, and the ratio for sending power to the power grid is set to one so that $t_{gk} = t_k$. The method then proceeds to step 20.

In step 17, either the output power of the power source has been determined to be less than or equal to the maximum input power of the battery or the power grid has been determined to be unavailable for power feed-in. In this step, the ratio for distributing power to the battery for charging is set to one so that $t_{bk} = t_k$, and the ratio for distributing power to the power grid is set to zero so that $t_{gk} = 0$. The method then proceeds to step 22.

In step 22, the battery is charged for a division of the time slot. The length of this time division is determined by the ratio determined in step 18 or by the predetermined ratios in steps 15 or 17 if the required conditions are met.

In step 24, the power is fed into the power grid for a division of the time slot. The length of this time division is determined by subtracting the time spent charging the battery from the total time of that time slot. At the end of the time slot, the method returns to the beginning step 12 and starts the process again, repeating the method for every time slot.

As discussed in the summary of the invention, the method may interchange steps 22 and 24, so that the power is fed into the grid first and then the power is used to charge the battery in the second time division. This may be an advantageous arrangement in situations where the power output is above the maximum input power of the battery at the beginning of a time slot, but is decreasing. In this case, power loss may be minimized by diverting power to the grid in the first time division as it may be fully utilized at a high power output. As the power output is decreasing over the time slot, when the power is diverted to the battery, less power will be wasted compared to charging the battery first and feeding into the grid afterwards. Whether the output power of the power source is decreasing or increasing may be determined by the output power data calculated in previous time slots.

More preferably, a certain time in a day can also be used as a sufficient condition for distributing all of the output power from the PV panel to charge the battery if it is not fully charged. For example, if the time comes to 15:00 and the battery is not fully charged, the controller may distribute all of the output power to charge the battery, regardless of the power loss, in order to avoid a low state of charge of the battery in the evening. The battery may be charged in constant current mode until the state of charge of the battery reaches 85%, at which point the battery is charged in constant voltage mode until the state of charge of the battery reaches 100%. When charging a battery in constant voltage mode, the battery requires a decreasing amount of power in order to charge as it approaches a state of charge of 100%. This method becomes effective once the battery has attained a state of charge of 85%, under which it is more efficient to charge the battery in constant current mode. As constant voltage mode required a lower power requirement to charge the battery, it may also be employed when the power output of the power source is below the maximum input power of the battery.

The battery capacity at the end of the solar radiations period may be determined by using the following formula:

$$B_{total} \text{ (Ah)} = SOC_{ini} \times B_{cap} + \sum_{k=1}^{n} I_{bk} \cdot t_{bk}$$

Wherein, $B_{total}$ is the battery capacity at the end of the day, measured in Ah, $SOC_{ini}$ is the initial state of charge of the battery, measured as a percentage, $B_{cap}$ is the total capacity of the battery, measured in Ah, $I_{bk}$ is the charging current of the battery over time slot k, measured in A, and $t_{bk}$ is the time division of time slot k for charging the battery. The sum represents the total charge fed to the battery over the total time period, t.

Figure 3:
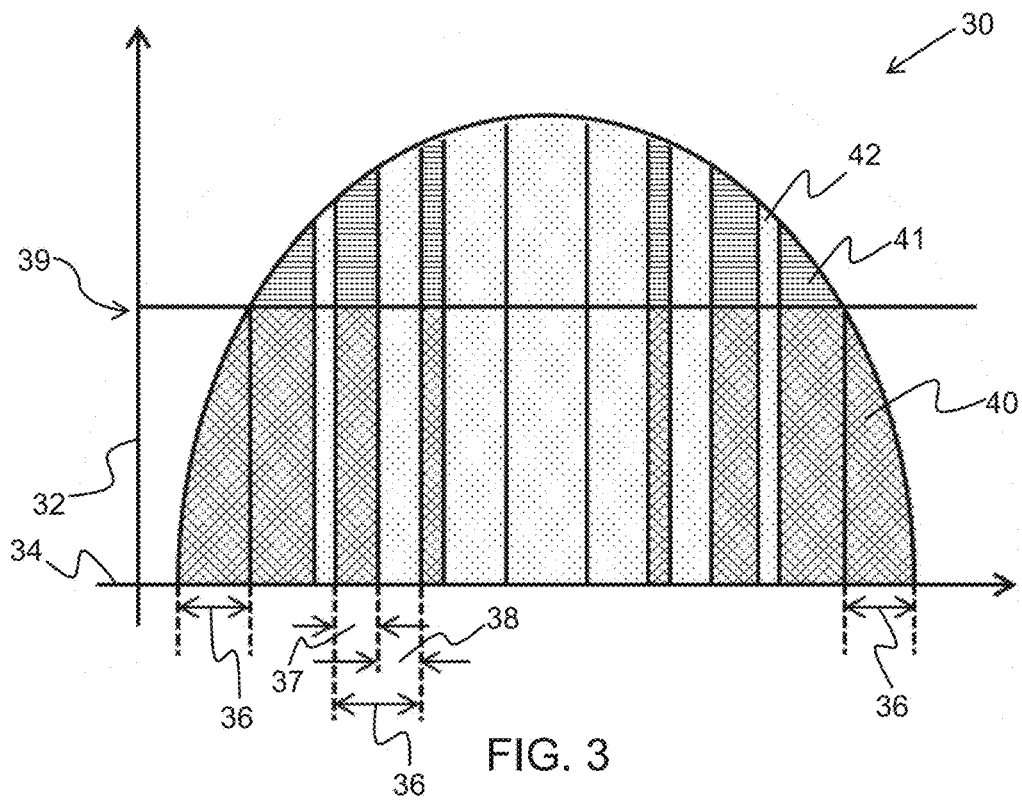
FIG. 3 shows a graph of output power against time with indications for power being sent to the battery, to the power grid or lost.

FIG. 3 shows a graph 30 of output power 32 against time 34. The shape of the graph is based on the power output of a solar panel over a solar radiation period. At the beginning of the solar radiation period, the solar panel receives very little insolation and so the output power levels are low. As the sun rises, so do the output power levels, peaking at midday and then decreasing along with the setting of the sun. The time axis of the graph has been divided into regular time slots 36, during which the methods shown in FIGS. 1 and 2 may occur. The time slots may be further divided into time divisions for distributing power to the battery 37 or the power grid 38. The length of these time divisions is governed by the ratio determined in step 8 of FIG. 1 and further detailed in FIG. 2.

When the output power, shown along axis 32, is less than or equal to the maximum input power of the battery 39, the power is distributed to the battery for charging. The energy supplied to the battery is shown by area 40 shaded by grids.

When the output power rises above the maximum input power level of the battery, the power source is limited to producing power at this level for as long as the power is being distributed to the battery for charging. The energy that is unutilized and lost through this limitation is shown by area 41 shaded by lines. In order to minimize this energy loss, the ratio for distributing power to the grid is increased for time slots where the output power level is above the maximum power input for the battery. The energy supplied to the grid is shown by area 42 shaded by dots. It can be seen that the higher the output power of the PV panel, the more a time slot is used for grid feeding and the less it is used for battery charging. In the middle time slot, the whole time slot is used for grid feeding.

Figure 4:
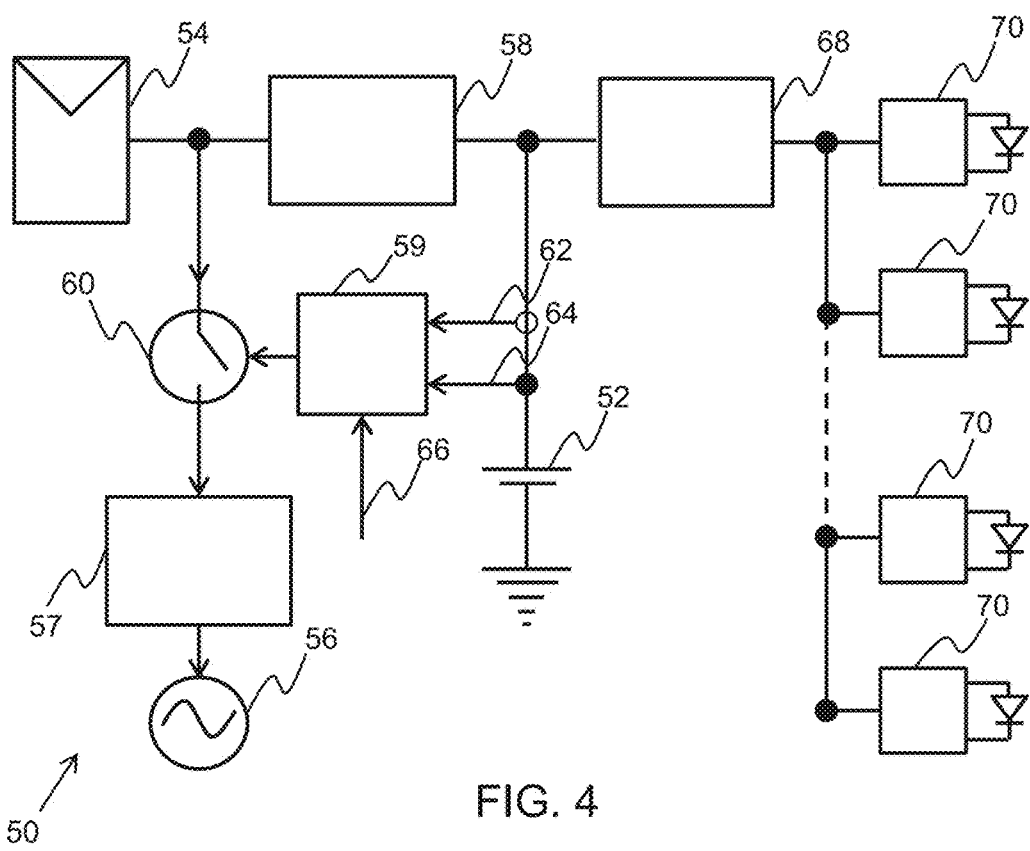
FIG. 4 shows a control system for implementing the method shown in FIG. 1 in a street lighting system with an integrated photovoltaic power generator.

FIG. 4 shows a control system 50 for implementing the methods shown in FIGS. 1 and 2 for a street lighting system comprising a battery 52 and a solar photovoltaic array 54 with grid 56 feed-in capabilities. The photovoltaic array produces DC power which must be fed through a grid feed-in inverter 57 in order to transform it into AC power, suitable for use by the power grid. The power produced by the photovoltaic array may not be exactly the same as the ideal power to charge the battery and so it is passed through a maximum power point tracking (MPPT) charge controller 58, which is a DC to DC converter that may optimize the match between the power output and the battery charging requirements.

The system 50 is controlled by a controller 59 that operates a switch 60 which may distribute the power produced by the photovoltaic array 54 to the battery 52 or the grid 56. The controller uses information such as the current 62 and voltage 64 ratings of the battery, as well as the current insolation levels 66. From the battery ratings, the maximum input power of the battery may be determined and compared with the output power of the photovoltaic array, which may be predicted using the measured insolation levels. The maximum power output of the photovoltaic array in time slot k may be determined through the following equation:

$$P^k_{max\_PV} = \frac{Ins^k \times PV_{cap}}{1000}$$

Wherein, $Ins^k$ is the insolation level measured in time slot k, measured in W/m, and $PV_{cap}$ is the peak output power of the photovoltaic array under full insolation, measured in kWp. The total power generated by the photovoltaic array over a solar radiation period may be calculated by using the following equation:

$$PV_E = \frac{Ins \times PV_{cap} \times t}{1000}$$

Wherein, $PV_E$ is the total energy generated by the photovoltaic array over the total time period, t, measured in kWh, Ins is the average daily insolation level, measured in W/m, and $PV_{cap}$ is as defined above.

If the controller 59 determines that the power output of the photovoltaic array 54 is less than or equal to the maximum power input of the battery 52, and is likely to remain below this level for the time slot based on the current insolation levels 66, the controller will use the switch 60 to distribute the power to the battery for charging. There is a level of insolation that will induce a power output from the photovoltaic array that is exactly equal to the maximum power input of the battery. This may be determined by using the following formula:

$$Ins_{hi\_bat} = \frac{V_{batt} \times I_{max\_bat}}{PV_{cap}}$$

Wherein, $Ins_{hi\_bat}$ is the insolation level at which the power output of the photovoltaic array is equal to the maximum input power of the battery, measured in W/m and the other terms are as defined above.

If the controller 59 determines that the power output of the photovoltaic array 54 is greater than the maximum power input of the battery 52, or is likely to rise above this level based on the current insolation levels 66, the controller will determine a ratio for dividing the time of a time slot into a period for distributing the power to the battery for charging and a period for distributing the power to the power grid.

The power from the battery 52 may then be passed through a DC bus regulator 68 and used to power the LEDs systems 70 that comprise the street light.

This system is most efficient when the maximum output power of the power source is large in comparison to the maximum input power of the battery.

Figure 5:
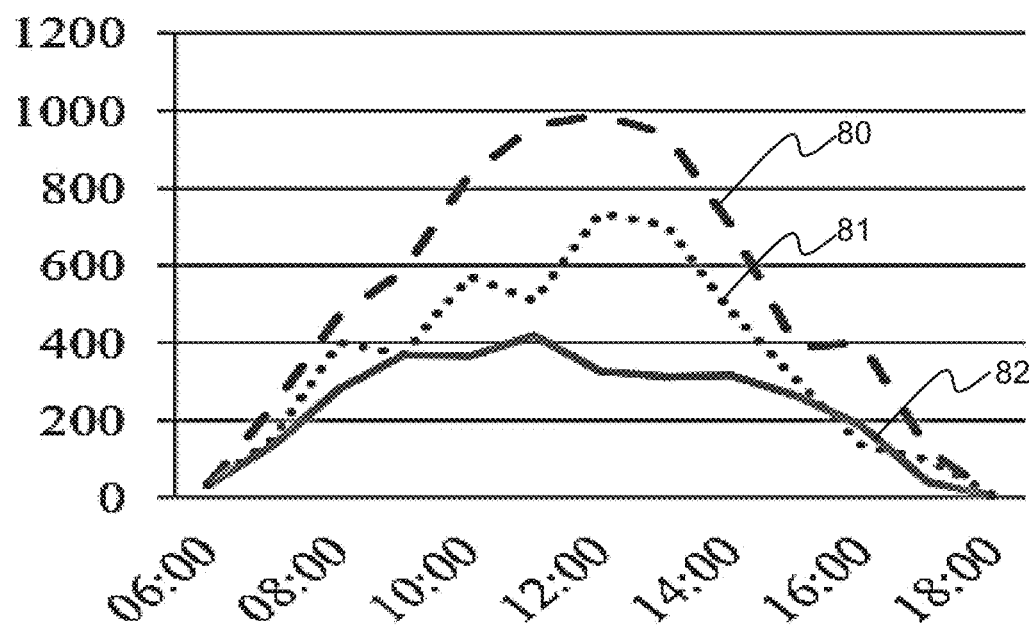
FIG. 5 shows a graph of insolation against time for three separate days with different weather conditions.

FIG. 5 shows a graph of insolation, measured in $W/m^2$, against time, measured in hours, for three separate days. The line 80 shows the insolation levels for a day of full sunshine, line 81 shows the insolation levels for a day of partial sunshine and line 82 shows the insolation levels for a completely overcast day.

FIGS. 6A to 6D show graphs of energy, measured in kWh, against time, measured in hours, comparing the energy distribution between a known control method and the proposed method described in FIGS. 1 and 2. The control method is employed for the sample system described in FIG. 4 based on the insolation levels 80 and 81 as shown in FIG. 5. The depth of discharge of the battery is maintained at 70%, meaning that the battery maintains a minimum charge of 30%, and battery charging current is set corresponding to a C-rate of 0.12C. For the proposed control method, constant current mode of battery charging is employed until the state of charge of the battery reaches 85%, followed by constant voltage mode until the SOC of the battery reaches 100%. Constant voltage mode is used only when the power output of the photovoltaic array is equal to or less than the maximum input power of the battery, or after 3:00 PM, whichever is earlier. This is done so as to ensure that the battery is fully charged at the end of the day. It is assumed that all the various parts of the system such as the MPPT charge controller and grid feed-in inverter are operating at 100% efficiency.

The battery is assumed to have an SOC of 30% at the start of the day and the duration of each time period, $t_k$, is taken as 10 minutes or ⅙ hours.

Figure 6A:
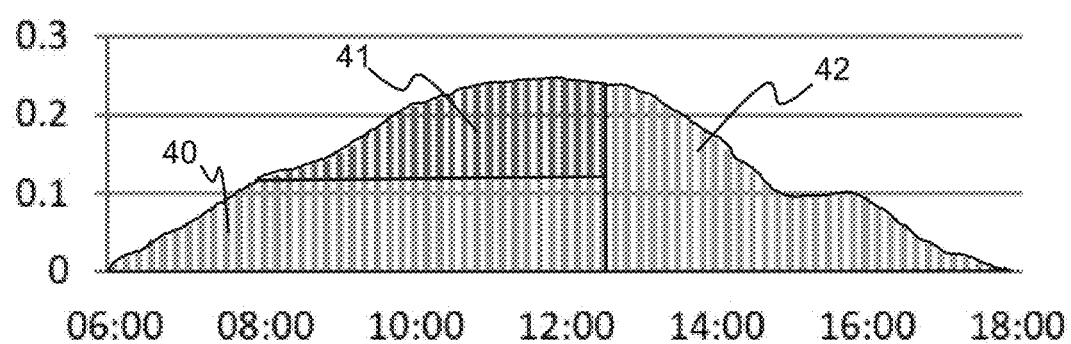
FIGS. 6A to 6D show graphs illustrating the predicted difference in power distribution between known control systems and the control system described in FIG. 4, based on the insolation levels shown in FIG. 5.
Figure 6B:
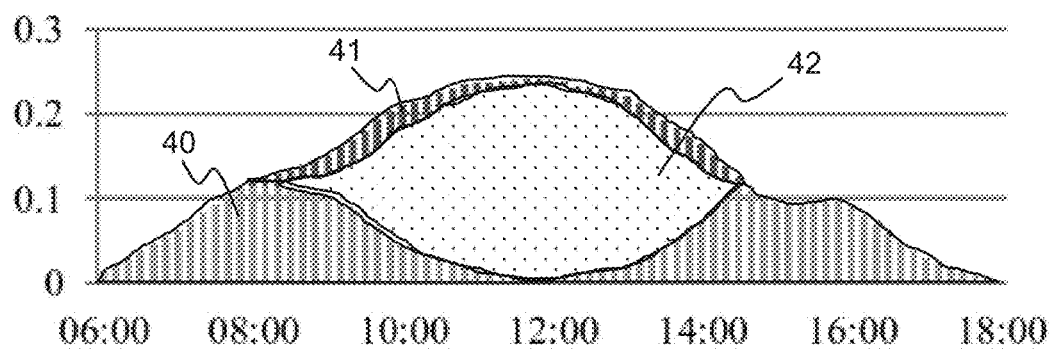

FIGS. 6A and 6B show a comparison between a known control method and the proposed control method on a day with high insolation levels, meaning a sunny day, as shown by line 80 in FIG. 5. The known control strategy shown in FIG. 6A results in a high level of energy loss 41, of about 23.5%. Employing the proposed control strategy, shown in FIG. 6B, the energy loss 41 may be reduced to about 8%, reducing the loss by nearly 66%.

Figure 6C:
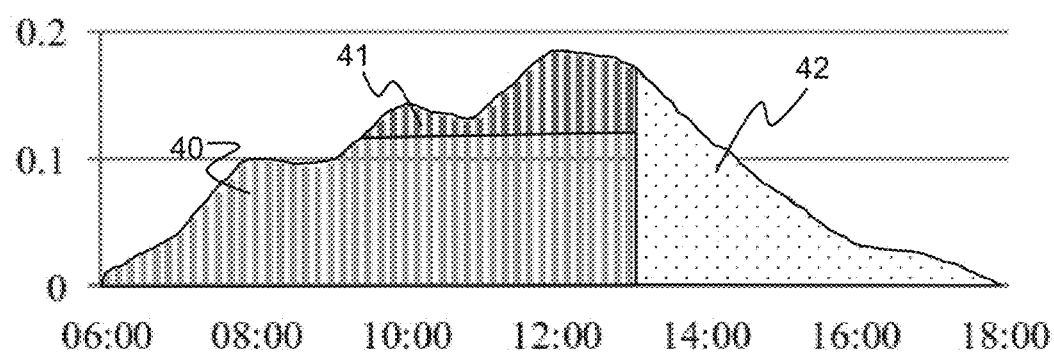
Figure 6D:
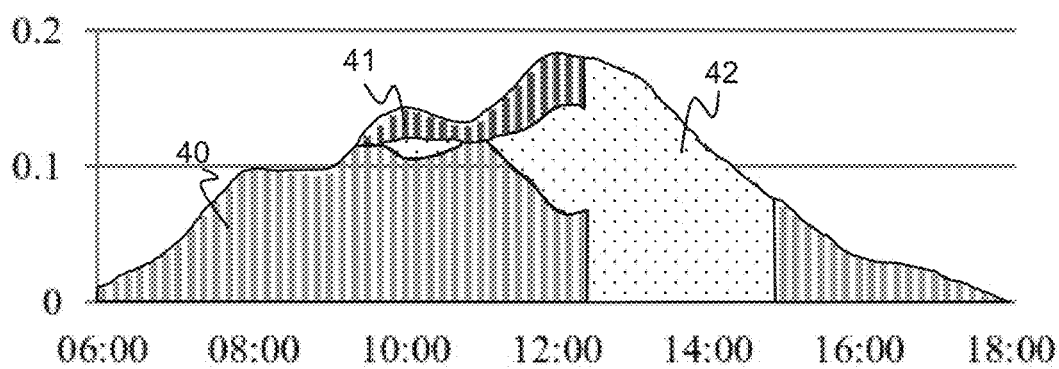

FIGS. 6C and 6D show the energy distribution on a partially sunny day, as shown by line 81 in FIG. 5, using the known and proposed control methods, respectively. The energy loss 41 is about 11.6% using known control method and 6.3% using the proposed method.

From FIGS. 6A to 6D, it can be seen that the proposed control method provides significant reductions in the amount of energy lost on days with high levels of insolation.

It should be noted that FIGS. 6A to 6D show the proportions of the energy distributions at a given time, rather than the explicit time divisions for a given time slot, as shown in FIG. 3.

The method may comprise dividing the solar radiation period into 10-200 time slots, $t_k$. Successive time slots durations may not be the same and may depend on the time of day. For example, a time slot at midday may be shorter than a time slot at 8 am as a change in weather conditions, such as an increase in cloud coverage, will have a larger effect on the insolation levels at midday, meaning that the system will have to respond rapidly in order to maintain efficiency. The peak power generation capability of the power source may be between 0.5 and 5 kWp and the battery may be rated between 12 and 72V. The battery is for example a lead-acid battery.

An exemplary calculation may be performed on real data. The table below shows hourly insolation data for Bangalore city on three different non-consecutive days.

TABLE 1

| Time | Global Horizontal Insolation (GHI) (W/m2) | | |
|---|---|---|---|
| (HH:MM) | 22 Aug. 2005 | 5 Aug. 2005 | 16 Aug. 2005 |
| 6:00 | 33 | 32 | 32 |
| 7:00 | 234 | 150 | 135 |
| 8:00 | 470 | 398 | 279 |
| 9:00 | 585 | 368 | 369 |
| 10:00 | 835 | 571 | 364 |
| 11:00 | 959 | 510 | 416 |
| 12:00 | 989 | 736 | 326 |
| 13:00 | 941 | 704 | 310 |
| 14:00 | 703 | 480 | 314 |

The experiments use the two days 5 Aug. 2005 (Day 1) and 22 Aug. 2005 (Day 2) with good solar insolation for proving the performance calculation of the proposed solution. The below table shows the calculated performance.

TABLE 2

| Parameter | Experimental setup using Known Control Method | | Proposed Control Method | |
|---|---|---|---|---|
| | Day 1 | Day 2 | Day 1 | Day 2 |
| Cumulative Energy available at PV output (kWh) | 8.81 | 9.12 | 8.81 | 9.12 |
| Energy Utilized for battery charging (kWh) | 4.04 | 3.99 | 3.79 | 4 |
| Energy fed to grid (kWh) | 2.46 | 2.49 | 3.91 | 3.93 |
| Un-utilized energy (%) | 26.2 | 28.94 | 12.5 | 13.16 |
| Battery SOC at the end of the day (%) | 100 | 100 | 95 | 100 |
| PV Capacity Utilization Factor (%) | 18 | 18 | 21.4 | 22 |

The above table shows that the unutilized energy in the proposed solution is reduced by more than 10% compared to a known control method. The energy stored in the battery for the proposed solution is almost the same as the known method, while the energy for grid feeding is increased by more than 50% compared to the known control method.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A method for distributing power from a renewable power source having a variable output power over time between an energy storage device and a power grid, wherein the method is adapted to, for each one of a plurality of time slots:
   determine an output power of the power source in the respective time slot;
   compare the output power of the power source to a maximum input power of the energy storage device;
   determine a ratio for distributing the output power to the energy storage device or the power grid in the respective time slot based on the comparison, wherein
   distributing the output power to the energy storage device as a priority when the output power of the power source is below the maximum input power of the energy storage device; and
   increasing the ratio for distributing the output power to the power grid and decreasing the ratio for distributing the output power to the energy storage device as the output power of the power source increases above the maximum input power of the energy storage device; and
   distribute the output power from the power source to either the energy storage device or the power grid in divisions of time in the respective time slot according to the determined ratio, wherein surplus output power produced by the power source, above the maximum input power of the energy storage device, is discarded when the output power is distributed to the energy storage device,
   wherein when determining the ratio for distributing power, setting the ratio to one for the energy storage device, and zero for the power grid, if the power grid is not available.

2. A method as claimed in claim 1, wherein the method is adapted to,
   when determining the output power of the power source, determine the output power of the power source by maximum power tracking during the proceeding time slot.

3. A method as claimed in claim 1, wherein the controller is adapted to, when determining the ratio for distributing power, set the ratio to one for the energy storage device, and zero for the power grid, thereby giving the energy storage device the priority, if the determined output power is below the maximum input power of the energy storage device.

4. A method as claimed in claim 1, wherein the method is adapted to, when determining the ratio for distributing power, set the ratio to one for the power grid, and zero for the energy storage device, thereby giving the power grid the priority as the output power of the power source reaches the peak output power of the power source.

5. A method as claimed in claim 1, wherein the method is adapted to, when determining the ratio for distributing power, set the ratio to zero for the energy storage device, and one for the power grid, if the energy storage device is fully charged.

6. A method as claimed in claim 1, wherein the power source comprises a photovoltaic panel, and the method is adapted to, when determining the ratio for distributing power:
   determine an insolation of the photovoltaic panel; and
   set the ratio to one for the energy storage device, and to zero for the power grid, if the insolation of the photovoltaic panel is less than a predetermined minimum value of insolation.

7. A method as claimed in claim 1, wherein the method is adapted to, when determining the ratio for distributing power, set the ratio to one for the energy storage device, and zero for the power grid when any of the below conditions are met:
   the output power of the power source is equal to or less than the maximum input power of the energy storage device; and
   a certain time of the day is reached,
wherein the method is adapted to, when distributing the energy, charge the energy storage device in constant voltage mode.

8. A method as claimed in claim 1, wherein the energy storage device comprises at least a battery, and the method is adapted to, when distributing the output power to the energy storage device:
   charge the battery in constant current mode until the state of charge of the battery reaches 85%, after which charge the battery in constant voltage mode until the state of charge of the battery reaches 100%.

9. A method as claimed in claim 1, wherein the time slots comprise regular intervals throughout a solar radiation period.

10. A system for distributing power from a power source having a variable output power over time between a battery and a power grid, comprising:
    a power source;
    a battery connected to the power source;
    a connection between the power source and the power grid;
    a controller for controlling the distribution of the output power from the power source between the battery and the power grid, wherein said controller is adapted to execute the method as claimed in claim 1.

11. A system as claimed in claim 10, wherein the power source comprises a photovoltaic system.

12. A computer readable medium storing a computer program, wherein said computer program is adapted to, when executed on a computer, cause the computer to carry out the steps of the method as claimed in claim 1.

* * * * *